May 16, 1967 G. L. GULICK 3,319,513

REGISTER VERIFICATION DEVICE

Filed April 30, 1962 2 Sheets-Sheet 1

INVENTOR
GRAHAM L. GULICK

BY

Wolfe, Hubbard, Voit + Osann
ATTYS.

May 16, 1967 G. L. GULICK 3,319,513

REGISTER VERIFICATION DEVICE

Filed April 30, 1962 2 Sheets-Sheet 2

INVENTOR.
GRAHAM L. GULICK
BY
Wolfe, Hubbard, Voit & Osann
ATTYS.

United States Patent Office 3,319,513
Patented May 16, 1967

3,319,513
REGISTER VERIFICATION DEVICE
Graham L. Gulick, 1742 W. Henderson St., Chicago, Ill. 60657
Filed Apr. 30, 1962, Ser. No. 191,015
4 Claims. (Cl. 88—14)

This invention relates generally to a method and apparatus for checking registry of two or more objects and has particular utility in the field of offset printing for checking registry of the printing plates.

Wherever it is necessary or desirable to check the registry of one object against another, or compare one to another, there is need of a quick, efficient, and economical way of doing the job. In the field of offset printing for example, when using more than one plate to achieve multicolor prints, it is necessary that the registry of the several printing plates to be used in each job be essentially perfect. Until now, it has been the usual practice in the trade to determine the extent of registry of the printing plates only after the same have been laboriously mounted on the press and a proof has been run. If, at this point, the plates are discovered to be out of register they must be removed, new plates processed and reinstated, and then another proof is run. The obviously unsatisfactory nature of this procedure emphasizes the advantages of being able to check registry of printing plates before mounting the same.

In an offset printing job, different plates are used for each base color to be used. The plates are developed in a manner similar to exposure of photographic film. The plates themselves are exposed by a photographic negative which has previously been exposed from the artist's layout, with the aid of appropriate filtering, to show only objects having one of the base colors to be used. A number of photo negatives are made of the same layout of the subject, each picking up one color. When a full set of plates has been exposed, the plates are mounted on the press and a run is made to determine registry. It will be appreciated that in this highly exacting and competitive field there is little margin for error which would detract from the quality of the workmanship—with today's high labor costs—result in wasted setting up and taking from out-of-register plates. Yet, because of the number of individual steps required between the making of the layout by the commercial art studio and the press run by the printer, there is substantial opportunity for error, even a small amount of which would require the retracing of previous steps. The burden of this process becomes even greater when it is realized that since error is possible virtually up to the time the plates are mounted on the plate cylinder of the press, the most exacting place for discovering it is on the press itself—by running a proof and then studying it to check registry. The time and expense of setting up a press for an offset job is substantial, and if the proof shows that the images on the plates are not in register, there is the added expense of tearing down, preparing new plates, and setting up again, during which time some men and machinery are idled completely while others, which might otherwise be productively employed, are employed to again set up the presses with the new plates. The new plates are subject to the same error during processing as the old, and they, too, of course, may be found to be out of register.

The printer, quite naturally, must reflect this rather cumbersome trial and error process in his charges and time estimate for each job, and on highly competitive jobs may gamble on having no such troubles, and lose. It is an object of this invention to significantly reduce the time and expense of offset printing by providing an economical way of checking registry of the printing plates prior to mounting them on the press and without having to make press proofs to determine it. It is another object to provide both method and apparatus for accomplishing these ends.

It is a more general object to provide both method and apparatus for visually checking identity or registry of two or more opaque objects with a high degree of accuracy and in an efficient and economical manner.

These and other objects and advantages will become more apparent from the reading of the following detailed description of the invention conjointly with the appended drawing, wherein.

Figure 1:
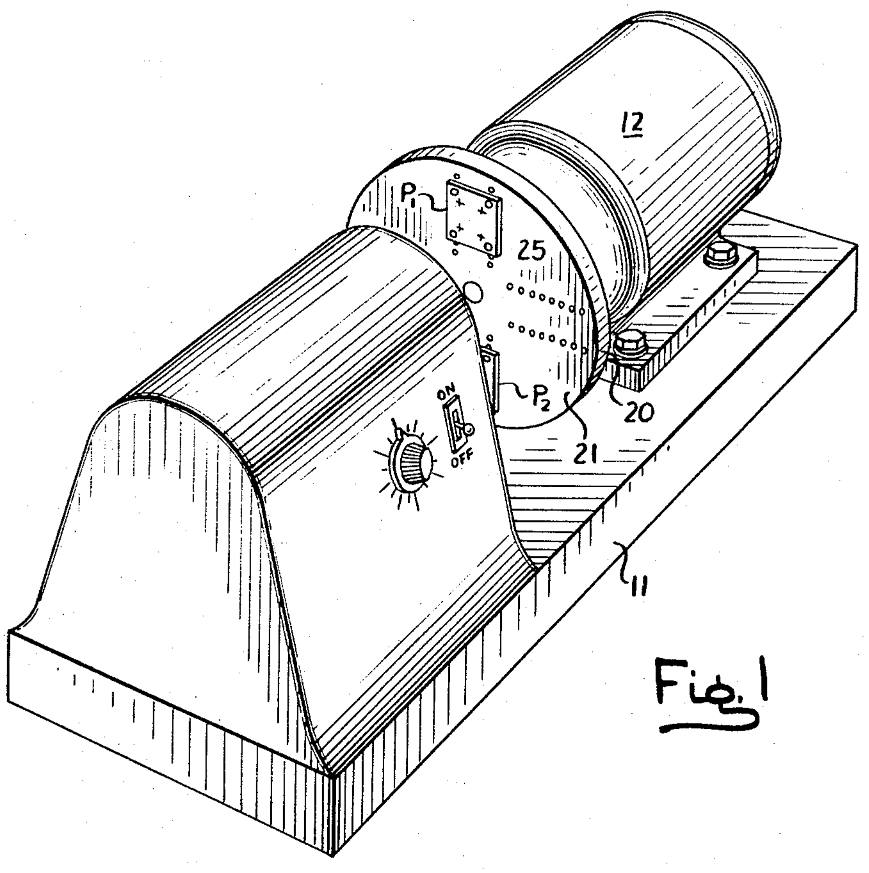
FIGURE 1 is a perspective view of one exemplary form of the apparatus embodying the present invention.
Figure 2:
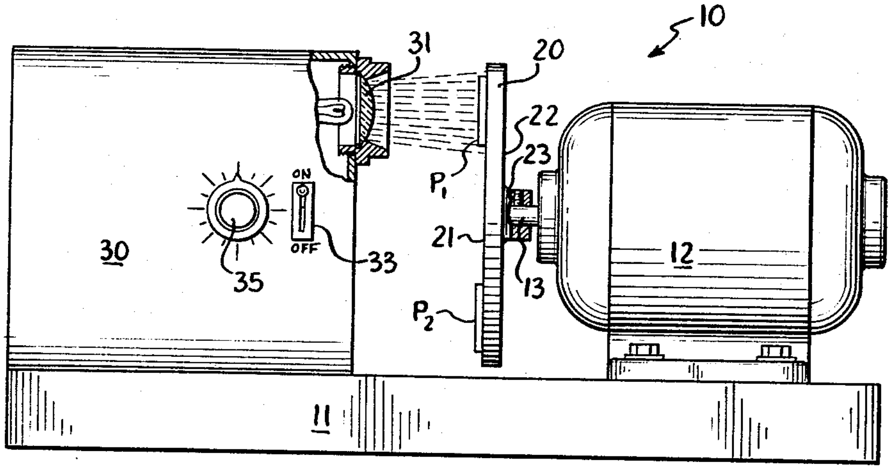
FIG. 2 is a plan view of FIG. 1.
Figure 3:
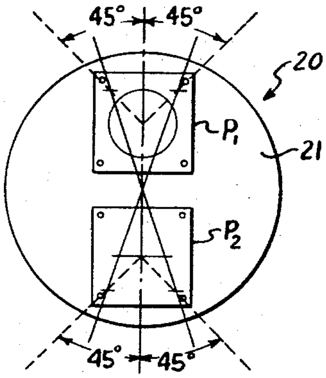
FIG. 3 shows a pair of objects mounted in accordance with the present invention.
Figure 3A:
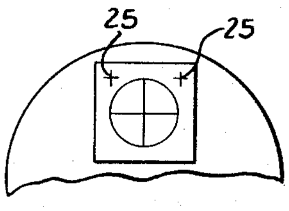
Figure 3B:
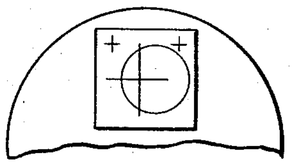
Figure 4:
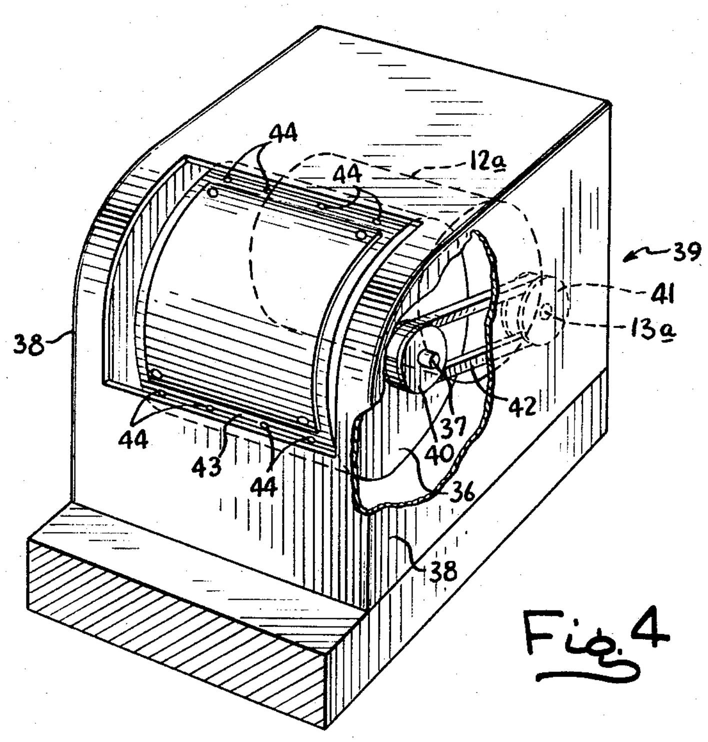

FIG. 3*a* illustrates the same objects as they would appear in the practice of the invention if they were in registry;

FIG. 3*b* illustrates the same objects as they would appear in the practice of the invention if they were out of register;

FIG. 4 is a modification of a portion of the FIG. 1 apparatus.

It will be appreciated from the further reading of this specification that the invention herein is susceptible of numerous alternative embodiments which would occur to those skilled in the art without departing from the spirit thereof, and although the following is presented with the description keyed in particular to the utility of the invention in the printing field, it is to be understood that the invention is intended to be limited solely to the extent of the spirit and scope of the appended claims.

The present invention comprises apparatus which is constructed to take advantage of a physiological phenomenon known as "persistence of vision," which simply means tht by illuminating a moving body with rather high intensity beams of light for relatively short intervals, the body will appear to be at rest or moving at a different frequency than it really is. This is so because the impression made on the retina of the eye as it views the object for the duration of the illuminating beam remains on the retina at least as long as the darkened interval between illuminations.

The present invention involves, in its preferred embodiment, a novel combination of apparatus which affords a heretofore unsuggested method for determining the identity or registry of relatively flat, opaque objects utilizing this physiological principle. Such a combination of apparatus is indicated at 10 in the accompanying drawings. The apparatus 10 includes a stand 11 upon which is mounted any suitable electric motor 12 having a rotatable shaft 13. The rotating parts of the motor are balanced to provide minimum shaft vibration when rotated.

The invention, in one of its aspects, contemplates the rapid rotation of the objects to be checked. To this end, a disc 20 is provided having a face 21 with a plurality of symmetrically disposed holes therethrough. The holes may be tapped for receiving mounting screws if so desired, as long as suitable means is provided for mounting objects symmetrically about the face of the rotatable disc 20. The back 22 of the disc is provided with a mounting flange 23 of any convenient construction, which is adapted to be slipped over the end of the rotating motor shaft 13 and there secured for rotation with the motor. The objects to be checked, in this case, offset printing plates P1 and P2, are mounted in symmetrical fashion about the center of the disc, on the same circumference and in diametrical opposition, as indicated in FIG. 3. Accurately placed register marks 25 may be etched or scratched on the respective printing plates so as to provide a base for fine determination of registry, as will later appear.

Opposite the face of the discs mounted on the motor on the stand 11, a suitable force of intermittent illumination is provided, and for purposes of example here, a stroboscopic light 30 is used. It will be appreciated that a continuous beam of light passed through a rotating disc having an aperture therein would serve the same purpose, as would other well-known devices for producing intermittent illumination.

A segment of the plane in which the disc rotates is illuminated by means of the strobe light 30 which is passed through a lens 31 so as to provide high intensity light directed toward that segment. The plates are so arranged on the disc that at least the portions of each bearing register marks pass through the illuminated segment as the disc is rotated. A power switch 33 is provided for applying a convenient source of electrical power both to the motor and to the stroboscopic light. A frequency control dial 35 is also provided on the stroboscope for making adjustments in the frequency of the illuminating beam, to be put out by the scope.

In order to check the registry of a pair of printing plates P, they are mounted on the disc in a symmetrical manner, as previously described, and the disc is secured to the rotating shaft 13 of the motor. The power switch is then moved to the "ON" position and the disc is rotated by the motor at a relatively high revolutions per minute. The frequency control on the stroboscope is adjusted in this instance to provide exactly two flashes of the illuminating beam for every revolution of the disc. In so doing, the outline or borders of the plates and the registry marks are exactly superimposed, i.e., are placed in registry by the flashing light, insofar as the eye can see, and the registry or nonregistry of the material on the plates will become immediately apparent. Referring to FIGS. 3*a* and 3*b*, it will be noted that in FIG. 3*a* the cross is precisely disposed within the circle and the register marks coincide, thus indicating full registry of the plates. In FIG. 3*b*, the cross appears to be partially outside of the circle, thus indicating lack of registry of the plates. In actual operation, lack of registry of the objects on the plates will become immediately apparent because the image seen by the eye will appear to jiggle or vibrate when there is no registry. Conversely, it will appear to be perfectly at rest when there is registry of the objects on the plate. It is for this reason that all external vibrations should be minimized so as to prevent interference with this view of the objects checked. Further, by rotating the objects at a relatively high r.p.m., the frequency of the illuminating flashes will be great enough that the eye will not be able to detect that the light source is intermittent, and this will further aid in visually determining the registry of the objects being checked.

It will be appreciated that additional time savings in checking registry of objects in this manner may be accomplished by equipping the motor with a speed detector of any known variety which may be interconnected with the stroboscopic light, for synchronizing the two automatically so that the light will flash at twice the speed of the motor rotation without having to "tune" it in. In this case, it would still be desirable to provide a fine frequency adjustment so as to compensate for any minor variations which may inadvertently occur. In view of the above, it will further be apparent that more than two objects may be checked at one time in this manner. By suitable adjustment of the frequency of the illuminating beam, a plurality of objects symmetrically disposed about the disc may be stopped in one position, at least insofar as the eye can determine, and the register checked in that manner. But, since it would be difficult, if not impossible, to determine which of the objects was out of register, or whether all were out of register, it may prove in some instances to be more convenient to check them, two at a time.

In some printing jobs, the size of the plate may be greater than six feet square. The size of a disc which would be required to rotate such plates would be burdensome and impractical, as would the power requirements, etc., attendant such an operation.

Thus, in FIG. 4, there is indicated an alternative embodiment of the invention adapted to accommodate large size objects. FIG. 4 illustrates an alternative construction of the portion of the device adapted to rotate the objects to be verified. A cylinder 36 is provided which is mounted on a shaft 37 which is longitudinally disposed along its axis of rotation. The ends of the shaft extend beyond the ends of the cylinder and are journaled in side panels 38 of a modified supporting stand 39. Pulleys 40 and 41 are secured in any convenient manner to the shaft 37 and the motor shaft **13*a* of the motor 12*a* and joined by a drive belt 42. The face or surface 43 of the cylinder is provided with apertures 44** for the mounting of plates thereon, and plates so mounted are rotated in a source of intermittent illumination, as previously described.

Although this equipment may be expected to be larger than that indicated in FIG. 1, yet it would not reach anywhere the proportions that would be necessary for checking very large printing plates on the FIG. 1 embodiment.

Thus, it will be appreciated that the registry of two objects, and, in particular, printing plates, may be almost immediately visually checked and with a high degree of accuracy prior to mounting them on the printing press, and the time and expense of running a proof for the purposes of determining registry and the time and machinery wasted if the plates prove to be out of registry, is eliminated, thus significantly reducing the cost of printing jobs of this type.

I claim as my invention:

1. In a device for checking the registry of a plurality of offset printing plates or the like, the combination comprising, a dynamically balanced member disposed for rotation about its axis, said member adapted to mount a plurality of plates symmetrically about the axis of rotation thereof, means for rotating said member about its axis, means opposite said member for providing a flashing beam of light directed onto said member for illuminating a portion thereof such that said plates when mounted on said member pass through said beam when said member is rotated, and means for regulating the frequency of said flashing beam with respect to the speed of rotation of said member so that said plates visually appear in said beam of light to be superimposed one upon the other when said member is rotated, thereby permitting the registry of said plates, or the lack thereof, to be visually observed.

2. The combination defined in claim 1 wherein a pair of said plates are symmetrically mounted about the axis of rotation of said member and said regulating means synchronizes said light beam for intermittent flashing at a frequency equal to twice the rotational speed in revolutions per minute of said member.

3. The combination defined in claim 2 wherein said rotatable member is in the form of a disc and said pair of plates are adapted to be symmetrically mounted on one face of the disc about the axis of rotation thereof and said flashing light beam is directed toward said one face of the disc.

4. The combination defined in claim 2 wherein said rotatable member is in the form of a cylinder and said pair of plates are adapted to be symmetrically mounted on the circumferential surface of the cylinder about the axis of rotation thereof and said flashing light beam is directed toward said circumferential surface of the cylinder.

References Cited by the Examiner

UNITED STATES PATENTS

| | | | |
|---|---|---|---|
| 2,407,996 | 9/1946 | Nies | 88—14 |
| 2,629,256 | 2/1953 | Rank | 88—14 |

FOREIGN PATENTS

| | | |
|---|---|---|
| 1,032,579 | 6/1958 | Germany. |

OTHER REFERENCES

Judge: Stereoscopic Photograph, pp. 369–371, Chapman and Hall, Ltd., 1950.

JEWELL H. PEDERSEN, *Primary Examiner.*

T. L. HUDSON, O. B. CHEW, *Assistant Examiners.*